United States Patent
Borns et al.

(10) Patent No.: US 6,792,757 B2
(45) Date of Patent: Sep. 21, 2004

(54) GAS TURBINE COMBUSTOR HEAT SHIELD IMPINGEMENT COOLING BAFFLE

(75) Inventors: Frederick G. Borns, Chandler, AZ (US); Ardeshir Riahi, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 71 days.

(21) Appl. No.: 10/288,950

(22) Filed: Nov. 5, 2002

(65) Prior Publication Data

US 2004/0083735 A1 May 6, 2004

(51) Int. Cl.[7] ............................................. F02G 1/00
(52) U.S. Cl. ........................... 60/772; 60/39.11; 60/752
(58) Field of Search ..................... 60/743, 752, 755, 60/756, 740, 796, 799, 39.37, 747, 746, 754, 772, 757, 749, 39.11

(56) References Cited

U.S. PATENT DOCUMENTS

| | | | |
|---|---|---|---|
| 4,097,292 A | 6/1978 | Huseby | |
| 4,241,586 A | 12/1980 | Caruel | |
| 4,365,470 A | * 12/1982 | Matthews et al. | ............ 60/800 |
| 4,914,918 A | 4/1990 | Sullivan | |
| 4,934,145 A | 6/1990 | Zeisser | |
| 4,998,581 A | 3/1991 | Lane | |
| 5,253,471 A | * 10/1993 | Richardson | .................. 60/804 |
| 5,271,219 A | 12/1993 | Richardson | |
| 5,363,643 A | 11/1994 | Halila | |
| 5,396,759 A | 3/1995 | Richardson | |
| 5,419,115 A | 5/1995 | Butler | |
| 5,490,389 A | * 2/1996 | Harrison et al. | .............. 60/737 |
| 5,509,270 A | 4/1996 | Pearce | |
| 5,664,412 A | * 9/1997 | Overton | ..................... 60/39.23 |
| 5,682,747 A | 11/1997 | Brown | |
| 5,894,732 A | 4/1999 | Kwan | |
| 5,956,955 A | 9/1999 | Schmid | |
| 5,974,805 A | 11/1999 | Allen | |
| 6,032,457 A | 3/2000 | McKinney | |
| 6,276,142 B1 | 8/2001 | Putz | |
| 6,298,667 B1 | 10/2001 | Glynn | |
| 6,546,733 B2 | * 4/2003 | North et al. | .................. 60/772 |

* cited by examiner

Primary Examiner—Justine R. Yu
Assistant Examiner—William H Rodriguez
(74) Attorney, Agent, or Firm—Robert Desmond, Esq.

(57) ABSTRACT

A heat shield for a combustor dome includes U-shaped baffles on the outer diameter area of the upstream surface of the heat shield. The baffles are clocked with respect to the impingement openings in the combustor dome. The baffles increase cooling of the heat shield by segregating the cooling air flow from the impingement openings and by reducing cross-flow at the outer diameter of the heat shield. The baffles also function as heat shield stiffeners. Slots extend radially inward from the outer rim of the heat shield. Keyholes are at the inner ends of the slots. The slots and keyholes reduce the hoop stresses of the heat shield.

33 Claims, 17 Drawing Sheets

1170–1251
1251–1332
1332–1412
1412–1493
1493–1574
1574–1655
1655–1735
1735–1816
1816–1897

| | -40000- -32667 |
| | -32667- -25333 |
| | -25333- -18000 |
| | -18000- -10667 |
| | -10667- -3333 |
| | -3333-4000 |
| | 4000-11333 |
| | 11333-18667 |
| | 18667-26000 |

| | |
|---|---|
| ▬ | −40000− −32667 |
| ▦ | −32667− −25333 |
| ▩ | −25333− −18000 |
| ▥ | −18000− −10667 |
| ▨ | −10667− −3333 |
| ☐ | −3333−4000 |
| ▥ | 4000−11333 |
| ▨ | 11333−18667 |
| ▨ | 18667−26000 |

GAS TURBINE COMBUSTOR HEAT SHIELD IMPINGEMENT COOLING BAFFLE

BACKGROUND OF THE INVENTION

The present invention generally relates to gas turbine engine combustor systems and, more particularly, to combustor heat shields.

Combustor heat shields have been used extensively in gas turbine engines. These heat shields are positioned between the combustor dome and the combustion chamber and are used to shield the combustor dome from the heat generated by combustion gases within the combustion chamber. There is a cooling gap between the heat shield and the combustor dome. Impingement openings in the combustor dome allow air to pass through the dome and into the cooling gap. This air then contacts the upstream surface of the heat shield, cooling the heat shield by impingement and convection heat transfer. High hoop stresses usually result from steep thermal gradients in both the radial and the "thru-the-wall" directions of the heat shield, particularly during transient thermal cycling occurring during engine power changes. Cyclic exposure to combustion gases causes heat shield creep and distortion. Heat shield creep and distortion is accelerated by cooling gap closure. As the heat shield distorts, the cooling gap begins metering flow that results in reduced and non-uniform cooling of the heat shield and combustor dome. The heat shield then collapses onto the dome and heat shield replacement is necessary. If the heat shield is not replaced, there is total loss of cooling to the combustor dome. Elevated heat shield temperatures accelerates oxidation of the heat shield and combustor dome resulting in reduced resistance to cracking.

Some heat shields are not easily accessible and the entire dome system must be replaced. Because replacement of the entire dome system is costly and frequent heat shield replacement is necessary, easily disassembled dome systems have been described. Although, this reduces the cost associated with replacing the heat shield, it does not reduce the need for frequent heat shield replacement.

Increasing the durability of the heat shield will reduce replacement frequency. Adding stiffeners to the heat shield is one known method of reducing thermal distortion of the heat shield. Other methods of increasing heat shield durability include increasing the volume of air that passes through the impingement openings. The increased air volume will increase heat shield cooling, but the quantity of cooling air available to the heat shield is generally restricted by the demand to cool other areas of the combustor and turbine. Additional methods of increasing heat shield durability include using stronger materials to form the heat shield and the incorporation of more effective cooling techniques.

Heat shield durability has been improved by increasing heat shield cooling effectiveness. Effusion holes have been placed in the heat shield, such that air passes from the cooling gap to the downstream surface of the heat shield there through. The air then forms a cooling air film on the downstream surface of the heat shield. Although this increases heat shield cooling effectiveness, the quantity of cooling air required may be prohibitive or all areas of the heat shield may not be sufficiently cooled. Also, the effusion holes weaken the structure of the heat shield.

A heat shield for a gas turbine combustion chamber has been disclosed in U.S. Pat. No. 5,956,955. The described system includes effusion holes that are positioned at an incline and a ring-shaped channel between the heat shield and the burner. Swirling air exits the cooling gap into the ring-shaped channel and then into the combustion chamber. This is said to intensively cool the particularly highly stressed areas of the heat shield. Although this system is said to cool the through-hole edge area of the heat shield, improved heat shield cooling is still needed. The through-hole edge area, or inner diameter area, is the area of the heat shield that surrounds the fuel nozzle. The outer diameter area of the heat shield is also highly stressed and is not sufficiently cooled by this system.

Another heat shield has been described in U.S. Pat. No. 5,509,270. The wedge shaped heat shield disclosed includes slots extending radially out from the fuel nozzle through-hole edge. Although these slots alleviate excessive compressive hoop stress on the inner diameter of the heat shield, this system does not sufficiently address heat shields that experience high hoop stresses at the outer diameter where edge distortion can be severe.

Annular heat shields with ribs positioned on the outer diameter area have been disclosed in U.S. Pat. No. 6,032,457. The ends of the ribs are accurate in shape and are said to reduce the film cooling air vortices. Although these heat shields may provide an increased rate of heat transfer by convection, still further improvements are needed. Additionally, the described heat shields do not sufficiently reduce the mitigating effects of cross-flow, in a cooling scheme design where there is impingement cooling at the outer edge of the heat shield. Cross-flow is the convergence of the air flows coming from different impingement openings. Cross-flow creates disturbance that reduces heat shield cooling efficiency. Unfortunately, these heat shields do not sufficiently reduce the disturbance caused by cross-flow.

As can be seen, there is a need for improved heat shield durability. Also, heat shields are needed wherein the mitigating effects of cross-flow are reduced. Moreover, there is a need for increased heat shield cooling without an attendant increase in the quantity of allocated cooling air or compromising ease of manufacture. Further, an inexpensive heat shield having improved cooling of the outer diameter area is needed. Heat shields having reduced hoop stresses and reduced temperature gradients are also needed.

SUMMARY OF THE INVENTION

In one aspect of the present invention, a cooling apparatus for a combustor dome comprises: an annular heat shield; and a plurality of baffles positioned on an upstream surface of the annular heat shield, the baffles are U-shaped and each baffle comprises an arc and two ribs, the arc is radially inward from the two ribs, the combustor dome has an outer row and at least one inner row of impingement openings there through.

In another aspect of the present invention, an apparatus for a turbine engine comprises: an annular heat shield; a plurality of baffles on an outer diameter area of the annular heat shield; and a plurality of slots extending radially inward from an outer rim of the annular heat shield, each slot having a keyhole positioned at a radially inward end of the slot.

In still another aspect of the present invention, a shielding system for a combustor dome comprises: an annular heat shield; and at least one U-shaped baffle positioned on an upstream surface of the annular heat shield, the U-shaped baffle is clocked such that the U-shaped baffle is capable of segregating an air flow, the U-shaped baffle comprises an arc and two ribs, the arc is radially inward from the two ribs, the combustor dome has an outer row and at least one inner row of impingement openings there through.

In yet another aspect of the present invention, a cooling apparatus for a combustor dome comprises: an annular heat shield formed from a metal selected from the group consisting of (SC)180, HA230, Mar-M-247 Eqx, and MA754; a plurality of baffles positioned on an upstream surface of the annular heat shield, the baffles each comprise an arc and two ribs, the ribs have a width between about 0.020 inches and about 0.030 inches, the combustor dome has an outer row and at least one inner row of impingement openings there through, the baffles are clocked such that the baffles are capable of segregating an air flow from the outer row of impingement openings from an air flow from an inner row of impingement openings; a plurality of slots extending radially inward from an outer rim of the annular heat shield; and a plurality of keyholes through the annular heat shield, such that there is one keyhole at an inner end of each slot.

In a further aspect of the present invention, a method of cooling a combustor dome comprises the steps of: providing an annular heat shield downstream of the combustor dome, the combustor dome has an inner and an outer row of impingement openings there through, the inner row is capable of producing an inner row air flow, the outer row is capable of producing an outer row air flow; and positioning a plurality of baffles on an upstream surface of the annular heat shield, such that the inner row air flow is segregated from the outer row air flow.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention generally provides gas turbine combustor heat shields and methods for producing the same. The heat shields produced according to the present invention may find beneficial use in many industries including aerospace, automotive, and plant operations. The heat shields of the present invention may be beneficial in applications including electricity generation, naval propulsion, pumping sets for gas and oil transmission, aircraft propulsion, automobile engines, and stationary power plants. This invention may be useful in any gas turbine application. The present invention may be useful with combustors having annular, cylindrical can, and can-annular forms. The present invention may be useful with any gas turbine utilizing axial flow type fuel injectors.

In one embodiment, the present invention provides a heat shield for a combustor dome. The heat shield may be positioned downstream of the combustor dome. Air contacting the upstream surface of the heat shield may cool the heat shield. The air may be supplied through impingement openings in the combustor dome. The heat shield may have baffles on the upstream surface of the heat shield. Unlike the prior art, the baffles of the present invention may reduce the mitigating effects of cross flow. The baffles may reduce temperature gradients across the heat shield and increase heat shield cooling. The baffles may be U-shaped and, unlike the prior art, they may segregate the airflow on the outer diameter area of the heat shield. The baffles may direct the air radially outward over the upstream surface of the heat shield. The U-shaped baffles may function as stiffeners to the heat shield and may minimize hoop stresses. Slots extending radially inward from the outer rim of the heat shield may reduce hoop stresses. Keyhole openings at the inner end of the slots may further reduce the hoop stresses. Further, unlike the prior art, the present invention provides improved cooling of the outer diameter area of the heat shield and increased heat shield durability.

Figure 1:
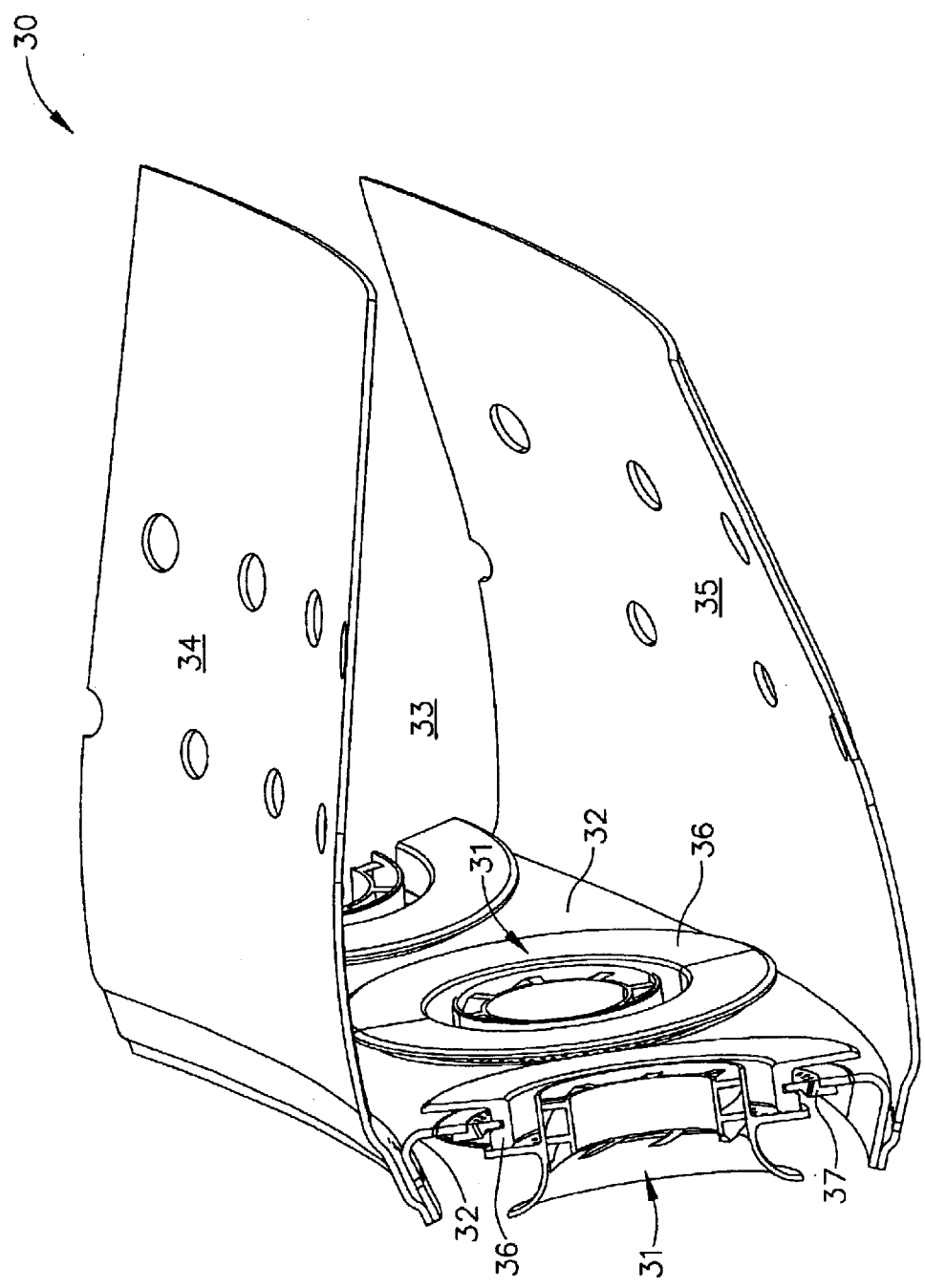
FIG. 1 is a partial three-dimensional diagram of a combustor according to one embodiment of the present invention.
Figure 2:
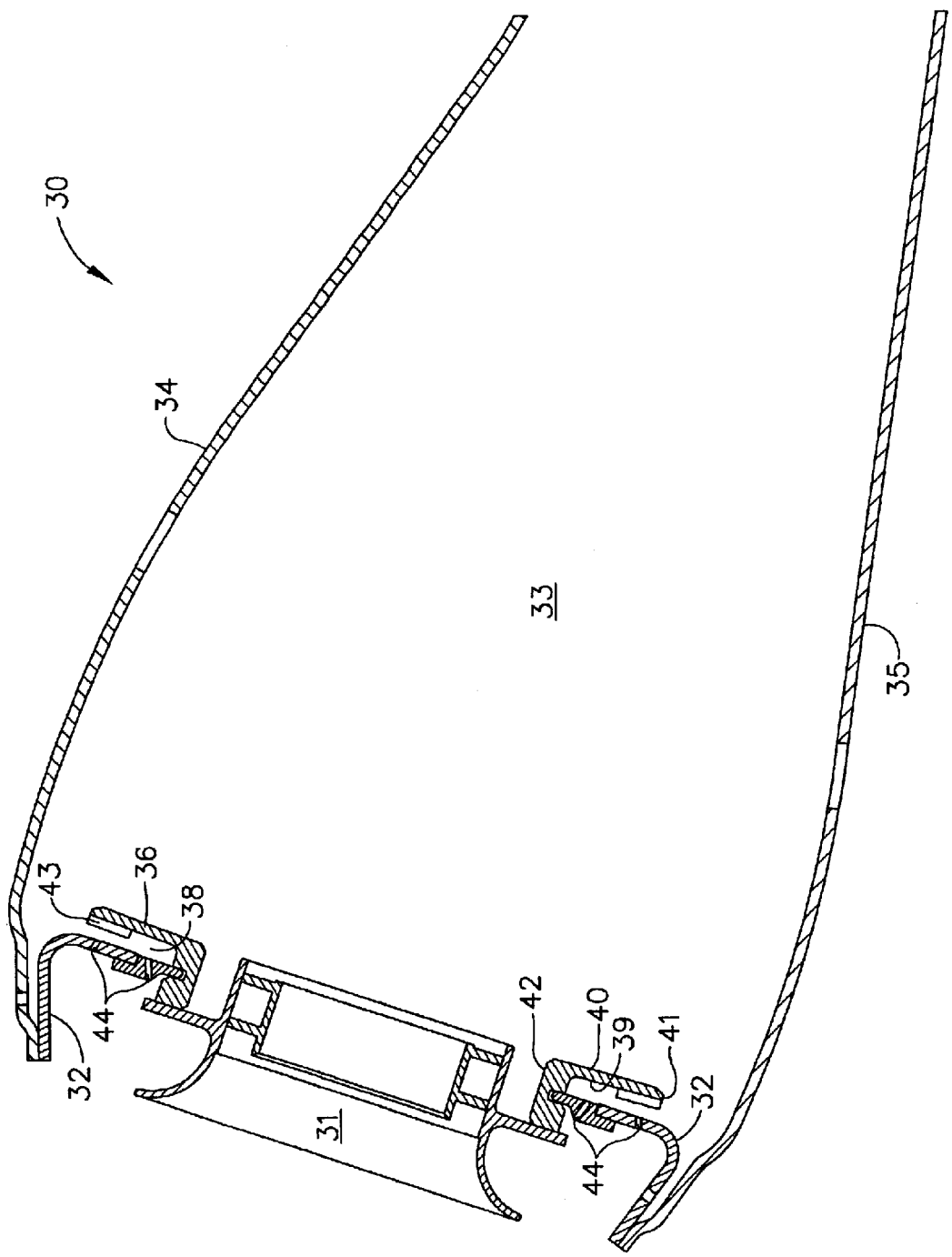
FIG. 2 is a partial cross section of a combustor according to one embodiment of the present invention.

In FIG. 1, a partial three-dimensional diagram of a combustor is depicted. The combustor 30 may comprise fuel nozzle 31, combustor dome 32, combustion chamber 33, inner combustor liner 34, outer combustor liner 35, heat shield 36, and split ring 37. As better seen in FIGS. 2 and 3, a cooling gap 38 may be located between the combustor dome 32 and the heat shield 36. The heat shield 36 may have an upstream surface 39, a down stream surface 40, an outer rim 41, and an inner rim 42. The heat shield 36 may include baffles 43 positioned on the upstream surface 39 of the heat shield 36. The combustor dome 32 may have impingement openings 44 there through.

During engine operation, a compressor (not shown) may be used to pressurize a volume of air. A first portion of the air may then pass into a carburetor (not shown). Fuel may be injected into the carburetor by a fuel injector (not shown). The carburetor may then mix the fuel and the first portion of air. The resulting fuel/air mixture may then pass from the carburetor through the fuel nozzle 31 and into the combustion chamber 33 where it may be ignited by an igniter (not shown). A second portion of the air may pass through the impingement openings 44 and into the cooling gap 38. This second portion of air may cool the heat shield 36 by contacting the upstream surface 39 of the heat shield 36. The baffle 43 may segregate the air from the impingement openings 44. The baffle 43 may direct the air towards the outer rim 41 of the heat shield 36. The air may then exit the cooling gap 38 at the outer rim 41 and form a cooling air film on the exposed surface of the combustor dome 32. The exposed surfaces are the areas between adjacent heat shields 36 and the areas near the outer combustor liner 35 and the inner combustor liner 34.

Figure 4A:
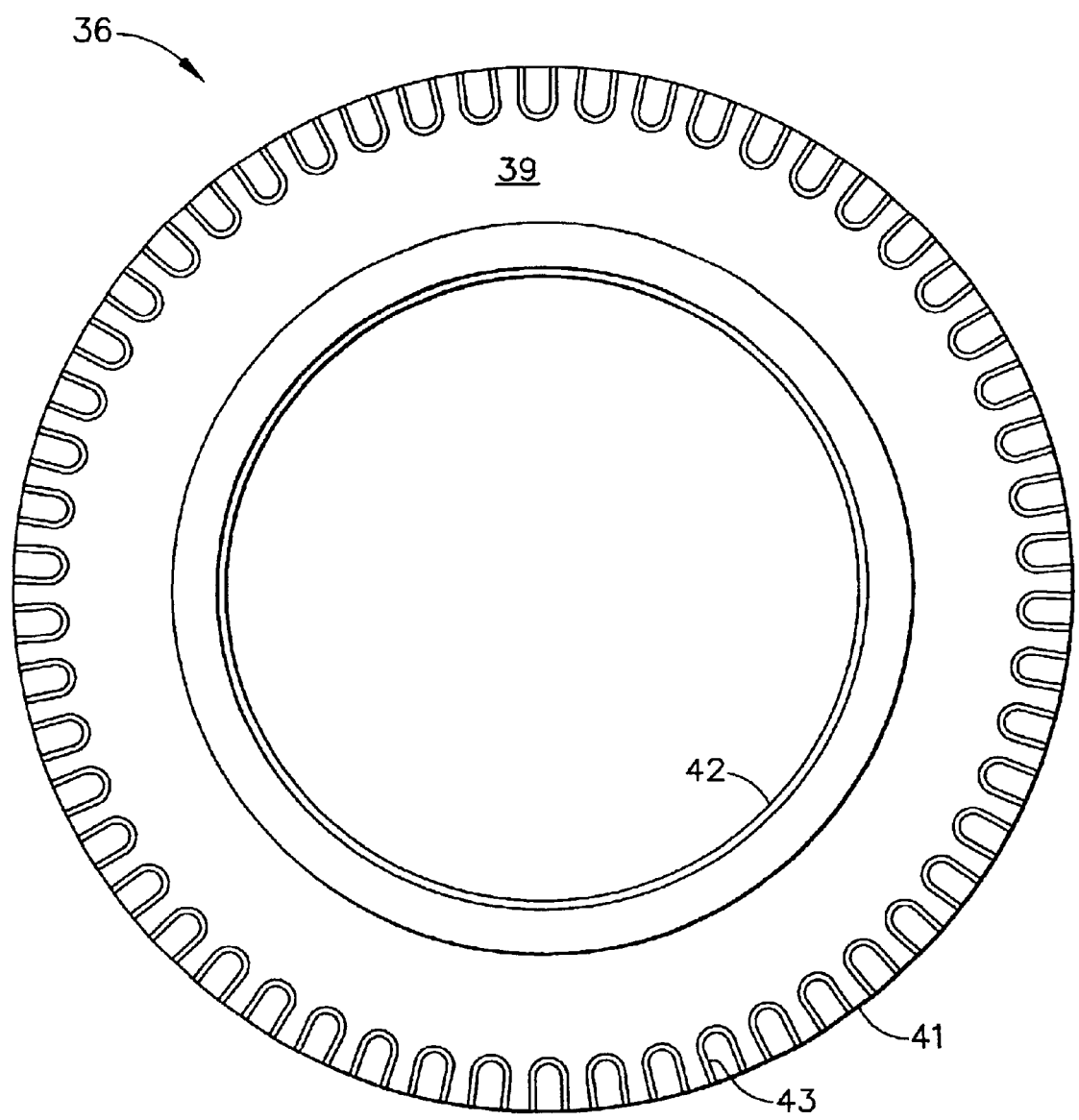
FIG. 4a is a diagram of the upstream surface of a heat shield according to one embodiment of the present invention.
Figure 4B:
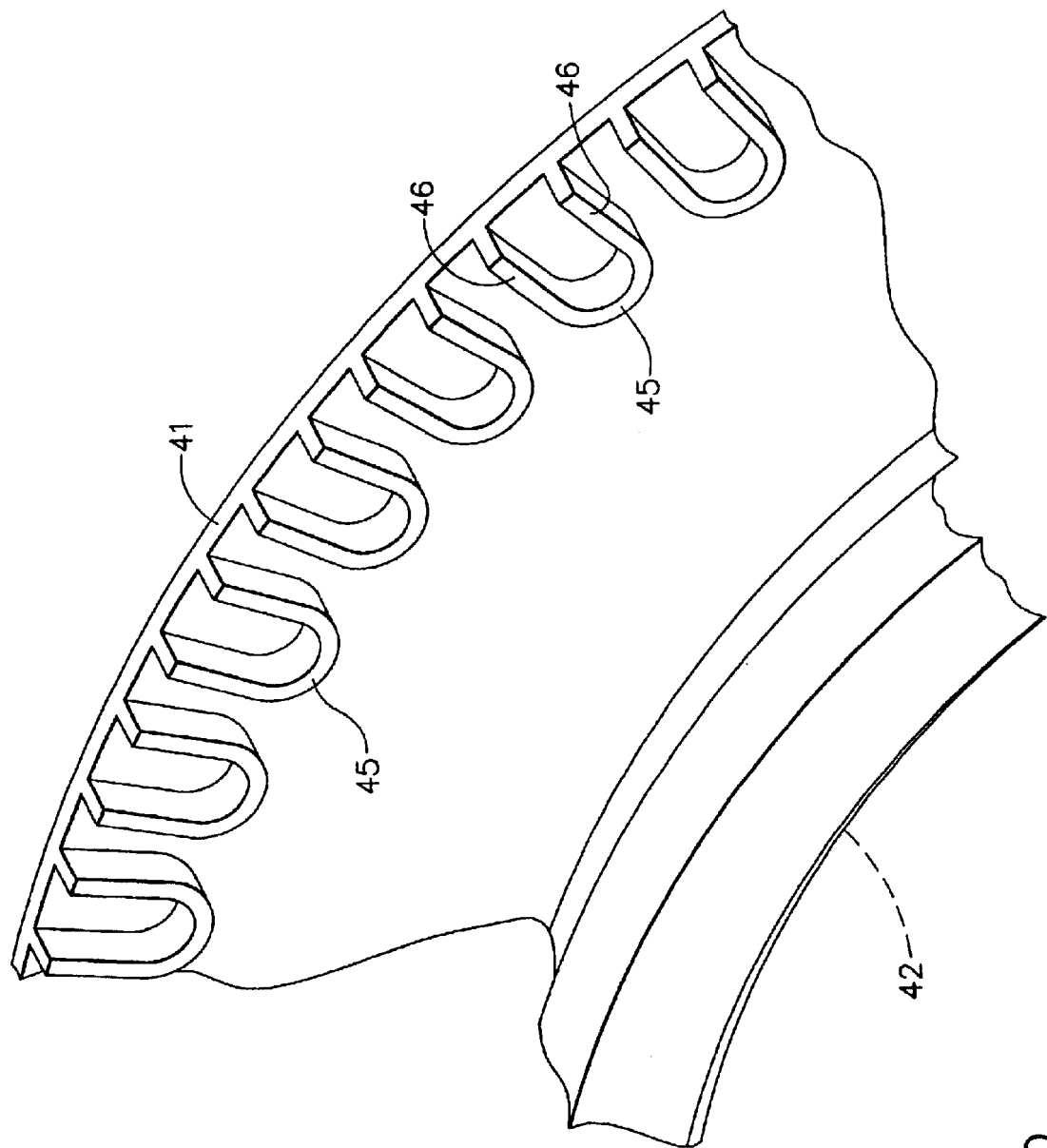
FIG. 4b is a partial diagram of the upstream surface of a heat shield according to one embodiment of the present invention.

As better seen in FIGS. 4a and 4b, the heat shield 36 may include baffles 43 positioned on the upstream surface 39 of the heat shield 36. The heat shield 36 may be annular. The baffles 43 may be U-shaped and may comprise an arc 45 and two ribs 46. The dimensions of the baffles 43 may vary depending on the dimensions of the heat shield 36, the composition of the heat shield 36, the configuration of the engine, and the casting limitations.

For baffles 43 manufactured using casting processes casting limitations may require the thickness, or width, of the ribs 46 to be at least about 0.025 inches. A useful thickness of the ribs 46 may be between about 0.020 inches and about 0.030 inches. The thickness of the arc 45 may be about equal to the thickness of the ribs 46.

For baffles 43 manufactured using casting processes casting limitations may require the rib height to rib thickness ratio to be less than about 3. A useful height of a baffle 43 may be between about 0.080 inches and about 0.090 inches. The baffle height is measured outward from and perpendicular to the upstream surface 39 of the heat shield 36. Baffles 43 that are shorter than about 0.050 inches may increase cooling to the heat shield 36 at the expense of the combustor dome 32. It may be that the effectiveness of the film cooling at the exposed areas of the combustor dome 32 decreases as the cooling gap 38 decreases. So the benefit in the heat shield cooling effectiveness is at the expense of the dome cooling effectiveness. The geometric optimization of the baffle design is hence a function of heat shield size as well as a balance between the heat shield cooling effectiveness and the dome film protection effectiveness.

The length of the baffles 43 may be maximized, insuring that the baffles 43 do not interfere with the upstream impingement flows. A useful length of the baffles 43 may be between about 0.15 inches and about 0.25 inches. Preferred baffles 43 may have a length of at least about 0.21 inches. The length of the baffles may be about half the distance between the inner rim 42 and outer rim 41.

As seen in FIGS. 4a and 4b, the baffles 43 may be positioned on the upstream surface 39 of the heat shield 36. The baffles 43 may be positioned in an outer diameter area of the heat shield 36. The outer diameter area is defined herein as the area of the heat shield 36 that is toward the outer rim 41 and away from the inner rim 42 of the heat shield 36. The baffles 43 may be oriented such that the ribs 46 extend radially inward from the outer rim 41 and the arc 45 is towards the inner rim 42, as shown in FIGS. 4a and 4b.

The baffles 43 on a heat shield 36 may be evenly spaced from one another.

The number of baffles 43 on the heat shield 36 may vary and may be dependent upon the diameter of the heat shield 36 and the engine configuration. For example, when the engine is a Honeywell AS907 engine and the heat shield 36 has a diameter of about 2.74 inches, the number of baffles may be about 54. For a given heat shield geometry, the number (N) of baffles 43 is fixed by: $N=(2\pi R)/(w+g+2b)$, where R is the radius of the heat shield 36, w is the distance between the two ribs 46 of a baffle 43, g is the tangential distance between two adjacent baffles 43, and b is the thickness of a rib 46. The design optimization process involves maximizing the number of baffles 43 for a given heat shield geometry, R, while maintaining adequate impingement flow. Increasing the number of baffles 43, results in increasing the number of impingement openings 44. However for a fixed amount of impingement cooling flow, the increase in the number of impingement openings 44 results in the reduction of the impingement opening diameter (to maintain constant impingement flow area and hence amount of flow). To optimize impingement-cooling effectiveness, a reduction in impingement opening diameter results in a reduction in baffle height (and hence the cooling gap 38 between the heat shield 36 and the combustor dome 32). This reduction in the cooling gap 38 may be beneficial for the heat shield's overall cooling effectiveness.

Figure 3:
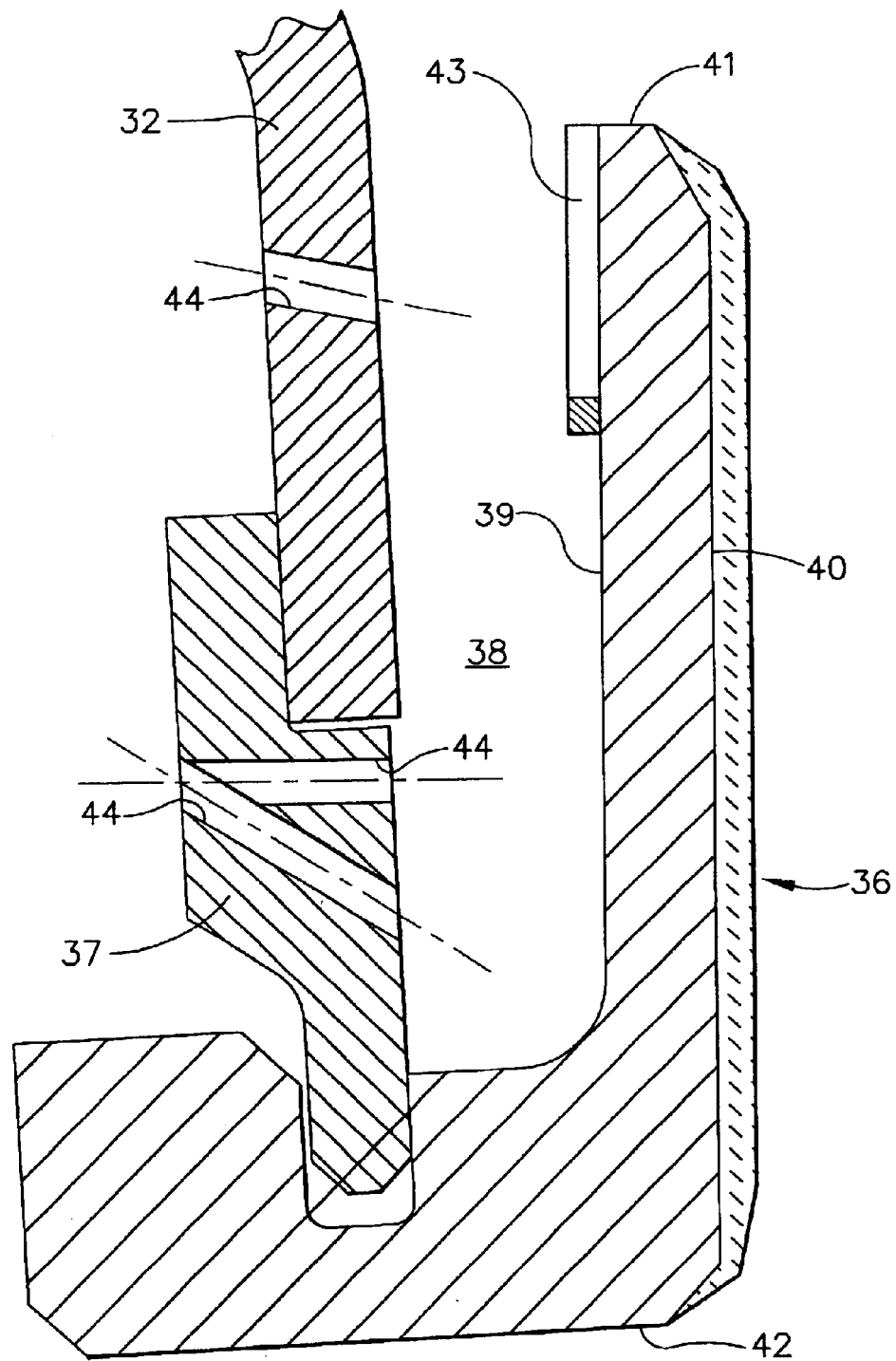
FIG. 3 is a cross sectional diagram of a heat shield according to one embodiment of the present invention.

As seen in FIG. 3, the combustor dome 32 and the split ring 37 may have impingement openings 44 there through. The combustor dome 32 may have at least one row of impingement openings 44. The combustor dome 32 may have an outer row of impingement openings 44. The outer row of impingement openings is the row closest to the outer rim 41 of the heat shield 36. The number of impingement openings 44 in the outer row may be equal to the number of baffles 43 on the heat shield 36. For optimum impingement cooling effectiveness, the ratio of rib height to impingement opening diameter may be less than about 5. The distance between the ribs 46 of a baffle 43, w, may be at least about twice the diameter of an impingement opening 44 in the outer row. This may insure that the impingement openings 44 on the combustor dome 32 are never blocked by the baffles 43, due to allowable dimensional tolerances for the baffles 43 as well as machining tolerances for the impingement openings 44. The diameter of impingement openings 44 may vary by row. There may be an outer row and one or more inner rows. The inner rows are the rows of impingement openings radially inward from the outer row. The diameter of the impingement openings 44 in the outer row may be greater than the diameter of the impingement openings 44 in the inner rows. For example, when the diameter of the impingement openings 44 in the outer row is about 0.035 inches, the diameter of the impingement openings 44 in the inner rows may be about 0.032 inches.

The baffles 43 may be clocked with respect to the outer row of impingement openings 44. Clocked is defined herein as positioned such that air passing through an impingement opening 44 in the outer row may contact the heat shield 36 in an area between the ribs 46 of a baffle 43. The baffles 43 may segregate the air coming from the impingement openings 44. The baffles 43 may isolate the air passing through the impingement openings 44 of the outer row from the air passing through the impingement openings 44 of the inner rows, resulting in airflow segregation and forced-channel cooling. The air passing through the impingement openings 44 of the outer row is referred to herein as outer row air flow. The air passing through the impingement openings 44 of the inner row is referred to herein as inner row air flow. The air from an impingement opening 44 in the outer row may impinge on the heat shield 36 between two ribs 46 of a baffle 43 and then flow radially outward between the ribs 46 of the baffle 43. The air from an impingement opening 44 in the inner rows may impinge on the heat shield 36 in an area radially inward from the baffles 43 and flow radially outward between two adjacent baffles 43. The airflow segregation may reduce the mitigating effects of cross flow and may decrease the temperature of the outer diameter area. Disturbance caused by cross flow effects may reduce cooling efficiency of the outer row. Cooling of the outer rim 41 and outer diameter area of the heat shield 36 may increase because the baffles 43 may decrease the cross flow effects.

The baffles 43 of the present invention may also function as stiffeners and may prevent the heat shield 36 from collapsing onto the combustor dome 32. The baffles 43 may provide added structural strength to the high stress outer diameter area of the heat shield 36. The baffles 43 may insure a continuous flow of air through the cooling gap 38. The baffles 43 may reduce heat shield hoop stresses. The present invention may minimize thermally-induced and stress-induced distortions of the heat shield 36.

Figure 5:
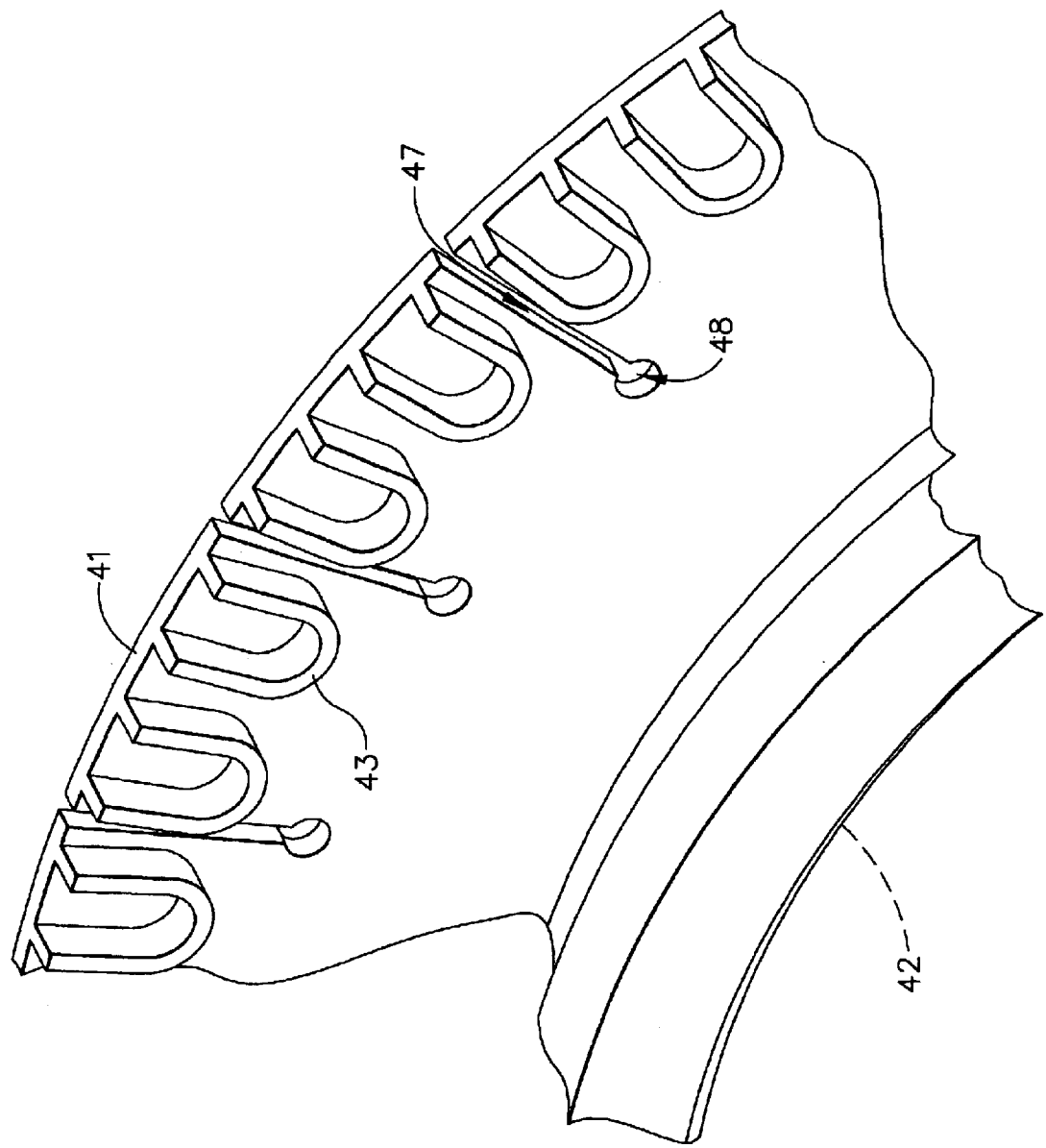
FIG. 5 is a partial diagram of the upstream surface of a heat shield according to another embodiment of the present invention.

The heat shields 36 may have slots 47 there through, as seen in FIG. 5. The slots 47 may extend radially inward from the outer rim 41. The slots 47 may be positioned between adjacent baffles 43. The slots may have a length of about half the distance between the inner rim 42 and the outer rim 41. The slots may have a width between about 0.010 inches and about 0.020 inches. The number of slots may vary depending on the configuration of the heat shield 36 and the number of baffles 43. The number of slots 47 may be less than the number of baffles 43. For example, when a heat shield 36 has fifty-four baffles 43, it may have six slots 47. The slots 47 may reduce the hoop stresses at the outer rim 41 of the heat shield 36.

The heat shields 36 may have keyholes 48 there through, as seen in FIG. 5. The keyholes 48 may be positioned at the radially inward end of the slots 47. The keyholes 48 may be circular and may have a diameter between about 0.045 inches and about 0.060 inches. The number of keyholes may vary depending on the number of slots 47. For example, when a heat shield 36 has six slots 47, it may have six keyholes 48. The keyholes 48 may reduce the concentrated stresses at the inward ends of the slots 47.

Known casting or machining methods may be used to form the baffles 43 and heat shields 36 of the present invention. The baffles 43 and heat shield 36 may be cast or machined together as one piece. If the casting process is utilized the heat shields 36 and baffles 43 may be manufactured by utilizing shell-type casting molds. Useful casting molds may include those described in U.S. Pat. Nos. 4,998,581 and 4,097,292, both of which are incorporated herein by reference. For this type of casting, a wax die in the desired shape may be used to form a shell mold into which a molten metal alloy may be poured. The wax pattern may be repeatedly immersed in a slurry comprising ceramic particles and a binder, such that a ceramic layer is formed on the wax pattern. A stucco coating may be applied between ceramic layers. After a sufficient thickness of ceramic has built up on the wax pattern, the wax may be removed. The completed mold may then be fired and used for casting.

The heat shields 36 and baffles 43 may comprise metal alloys. Useful metal alloys may include nickel based alloys and cobalt based alloys. Preferred metal alloys from which the heat shields 36 and baffles 43 may be cast may include Single Crystal (SC)180 available from Honeywell and Mar-M247 Eqx Material available from Martin Marietta. Preferred metal alloys from which the heat shields 36 and baffles 43 may be machined may include HA230 available from Haynes International and MA754 available from Special Metals.

The slots 47 and keyholes 48 may be made after the heat shield 36 has been machined or cast. They may be formed by any known method. Useful processes for forming the slots 47 and the keyholes 48 may include electrical discharge machining (EDM) and electrochemical machining (ECM). EDM applications require the use of a spark erosion machine. EDM applications are known in the art and include drilling by spark erosion, which may be useful for forming the keyholes 48. Other known EDM applications include cutting by spark erosion using a flat electrode and cutting by spark erosion using a wire, both of which may be useful in forming the slots 47. ECM applications are also known in the art, have been widely used in the aircraft industry, and require the use of an electrolytic machine tool.

Thermal barrier coatings (TBC) are known in the art and may be applied to the downstream surface 40 of the heat shield 36. A useful TBC may be Zircoat (by PRAXAIR company) and may be applied by plasma spray technique. These coatings may provide thermal insulation against the hot combustion gases and may reduce the cooling requirement of the heat shield 36. Any known TBC may be useful in the present invention.

The heat shields 36 of the present invention may be positioned within the combustor 30. The heat shields 36 may be interposed between the combustion chamber 33 and the combustor dome 32. The heat shields 36 may be secured such that the baffles 43 remain clocked during engine operation. The baffles 43 may be fixed relative to the impingement openings 44. The heat shields 36 may be secured within the combustor 30 by any conventional means, such as by screws or welding. The heat shields 36 may be secured within the combustor 30 by split rings 37, as seen in FIGS. 1 and 3. Various split rings 37 are known in the art, any of which may be useful for securing the heat shields 36 of the present invention within the combustor 30. Known split rings 37 may be modified to reduce heat shield movement and to maintain the baffles 43 in a clocked state during engine operation. The heat shield 36 may be secured such that there is a uniform gap between the baffles 43 and the combustor dome 32. A uniform gap between the combustor dome 32 and the baffles 43 may be required to accommodate profile tolerances during assembly and to allow for axial deflection of the heat shield 36 at running conditions to minimize stresses.

EXAMPLE 1

Figure 6A:
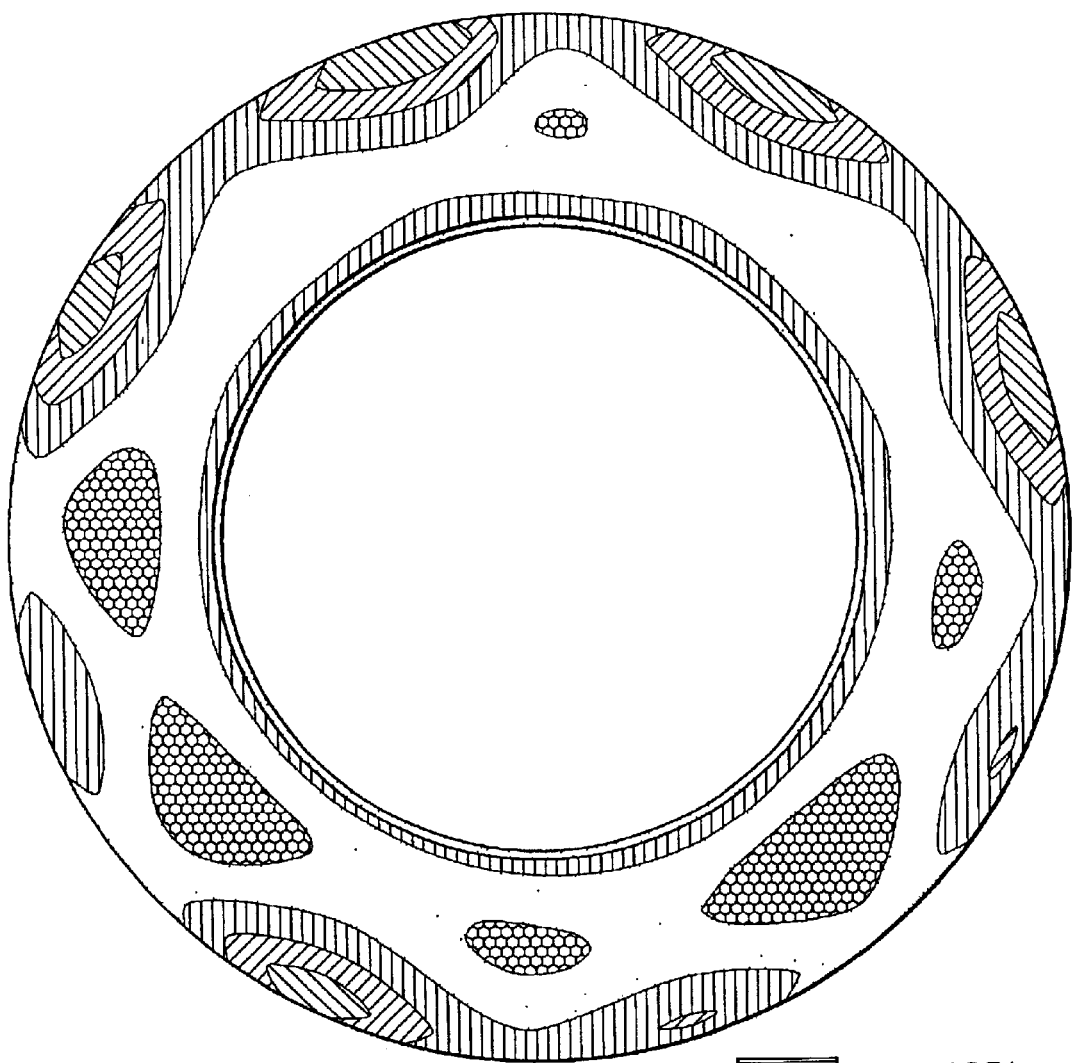
FIG. 6a is a temperature gradient diagram of the downstream surface of a prior art unbaffled heat shield.
Figure 6A:
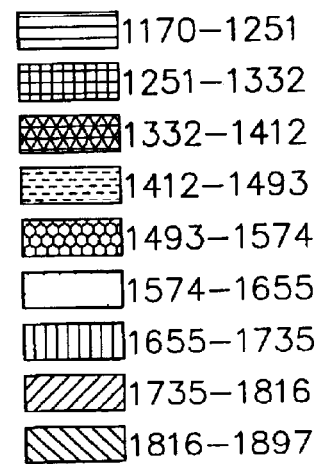
Figure 6B:
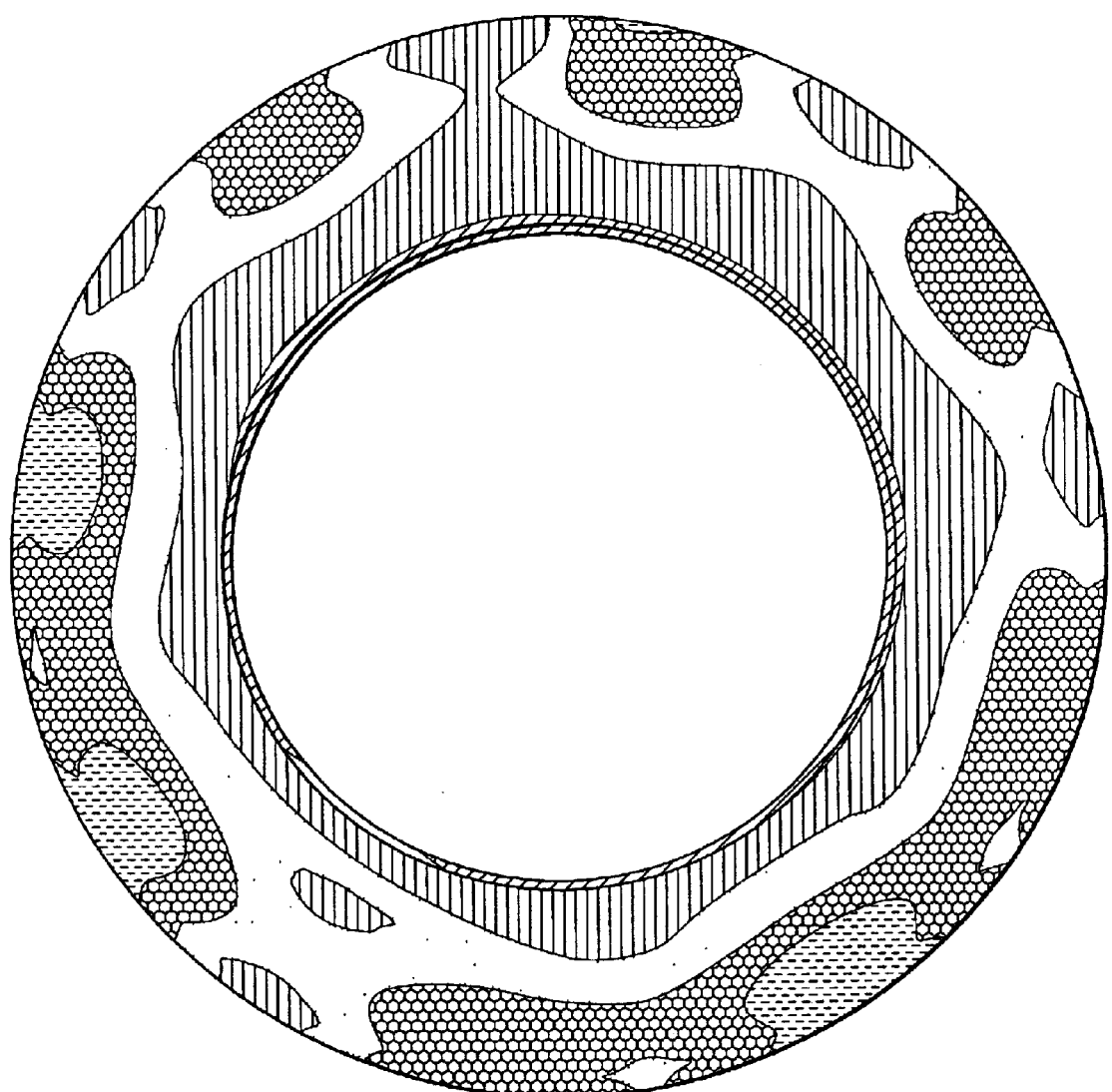
FIG. 6b is a temperature gradient diagram of the downstream surface of a baffled heat shield according to one embodiment of the present invention.
Figure 7A:
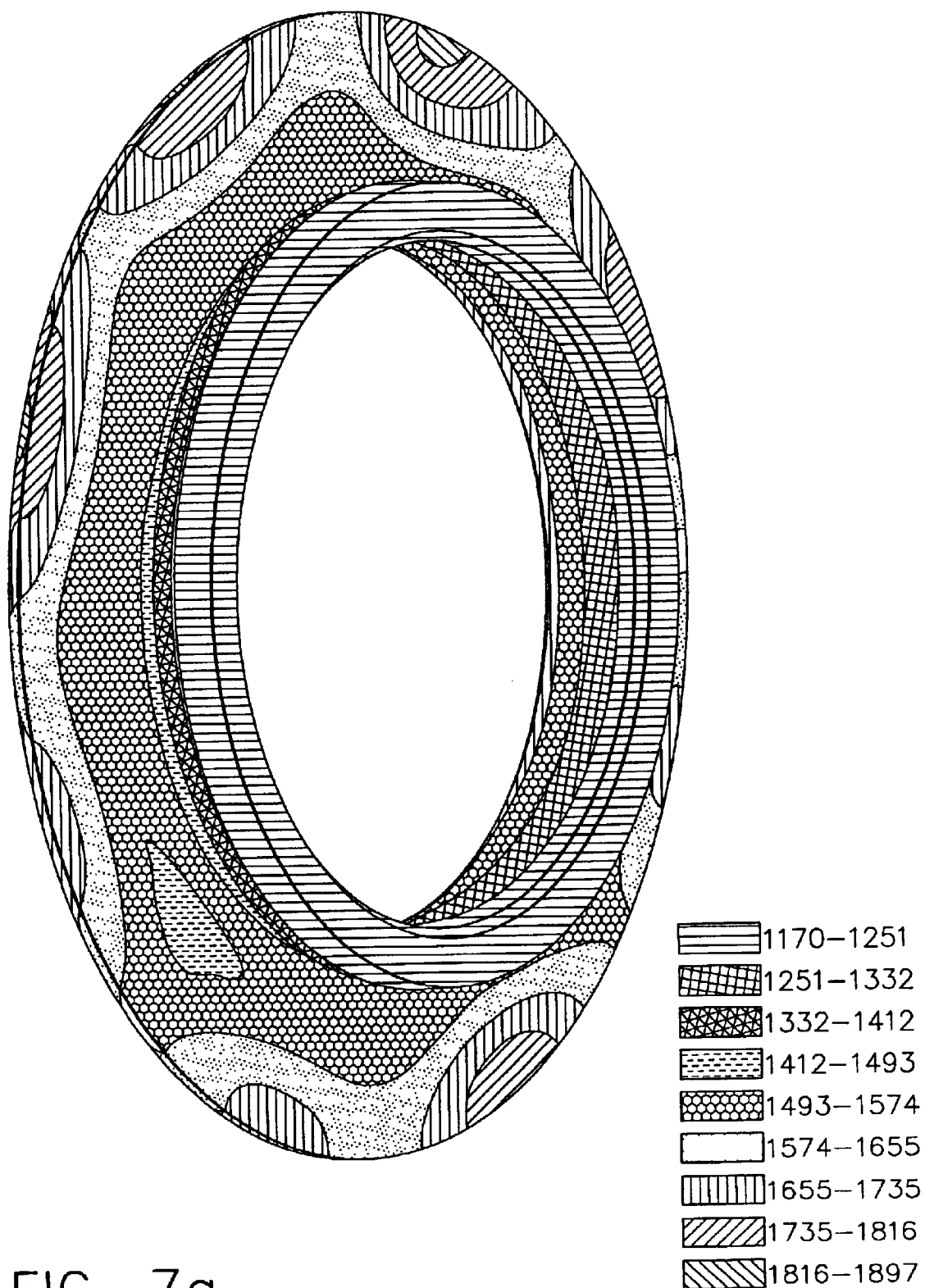
FIG. 7a is a temperature gradient diagram of the upstream surface of a prior art unbaffled heat shield.
Figure 7B:
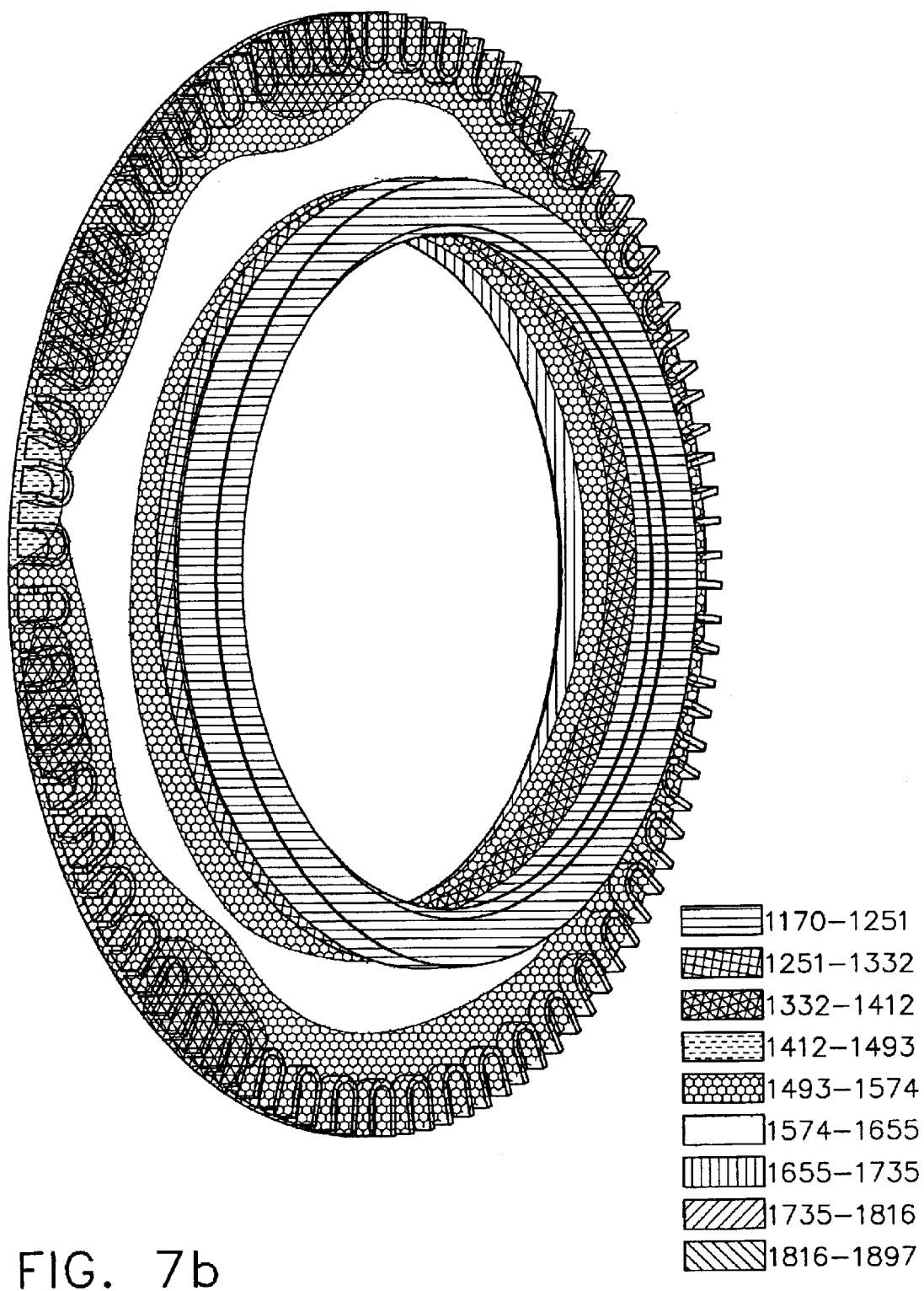
FIG. 7b is a temperature gradient diagram of the upstream surface of a baffled heat shield according to one embodiment of the present invention.

The surface temperature gradient of a baffled heat shield according to an embodiment of the present invention was compared to that of an unbaffled heat shield. Ansys 5.7.1 software was used to calculate the surface temperatures gradients of the heat shields. Thermocouple data from a Honeywell AS907 engine during Sea Level Take Off (SLTO) was used to calibrate the model. In these models, a flame is in direct contact with the downstream surface of the heat shield. FIGS. 6a and 6b show the temperature gradients on the downstream surface of an unbaffled heat shield and a baffled heat shield, respectively. FIGS. 7a and 7b show the temperature gradients on the upstream surface of an unbaffled heat shield and a baffled heat shield, respectively. The maximum outer rim temperature was reduced from 1895° F. for the unbaffled heat shield to 1727° F. for the baffled heat shield. As can be seen, the temperature gradient across the surface of the heat shield was also reduced.

EXAMPLE 2

Hoop stresses of a baffled heat shield according to an embodiment of the present invention were compared to those of an unbaffled heat shield. Ansys 5.7.1 software was used to calculate the hoop stresses of a baffled heat shield and an unbaffled heat shield. Data from a Honeywell AS907 engine during Sea Level Take Off (SLTO) was used to calibrate the model.

For comparison, the yield strengths for two materials were determined by test bar analysis and are shown in Table 1.

TABLE 1

| Material | Temperature (° F.) | Yield Strength (Ksi) |
| --- | --- | --- |
| HA230 | 1872 | 7.8 |
| HA230 | 1680 | 21.8 |
| Mar-M-247 Eqx | 1872 | 28.0 |
| Mar-M-247 Eqx | 1730 | 54.5 |
| Mar-M-247 Eqx | 1660 | 70.0 |
| Mar-M-247 Eqx | 1500 | 104.0 |

Figure 8:
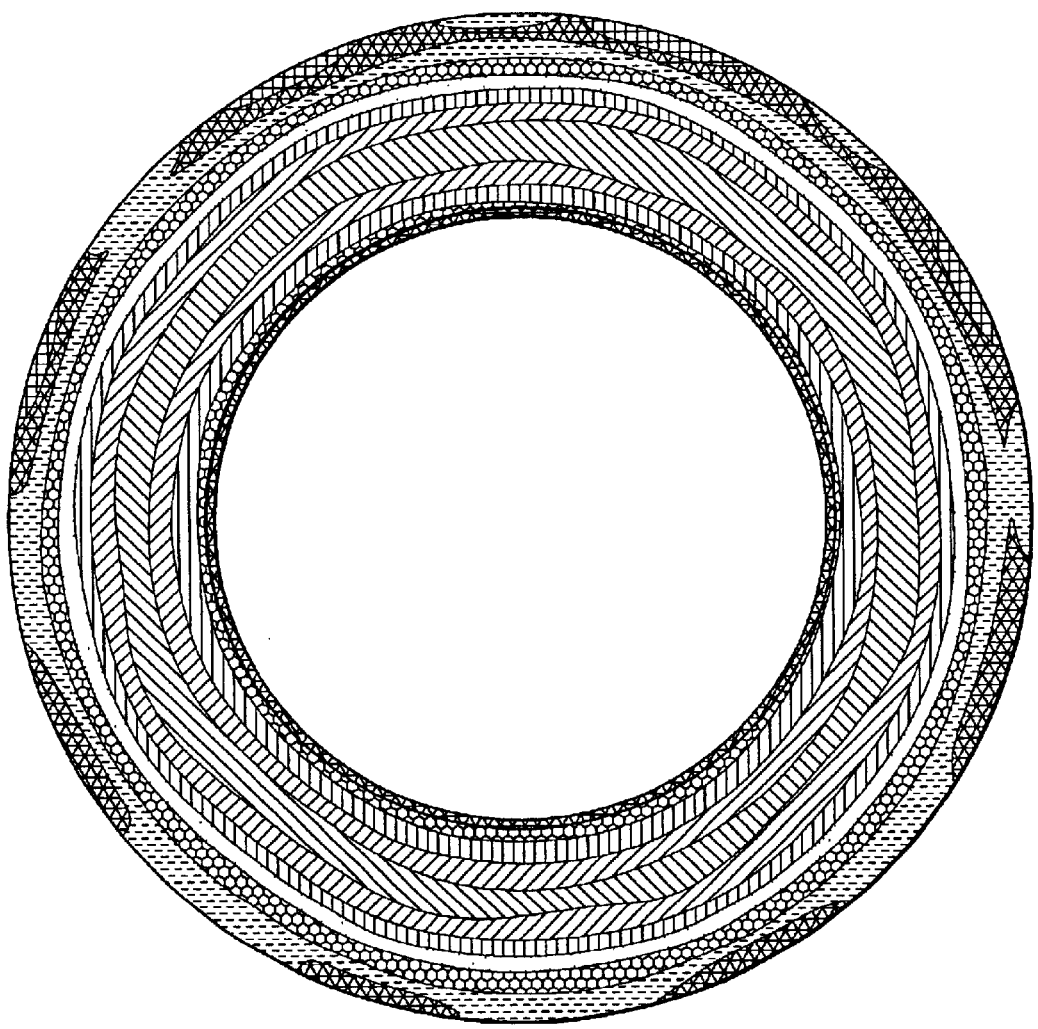
FIG. 8 is a stress gradient diagram of the downstream surface of a prior art unbaffled heat shield.

Hoop stresses for the downstream surface of an unbaffled heat shield are shown in FIG. 8. An outer rim hoop stress was calculated to be −38.8 Ksi at 1872° F. The hoop stress of another portion of the heat shield was calculated to be 25.3 Ksi at 1680° F. As can be seen, the hoop stresses of the unbaffled heat shield are well beyond the yield strength of HA230 and Mar-M247 at 1872° F.

Figure 9A:
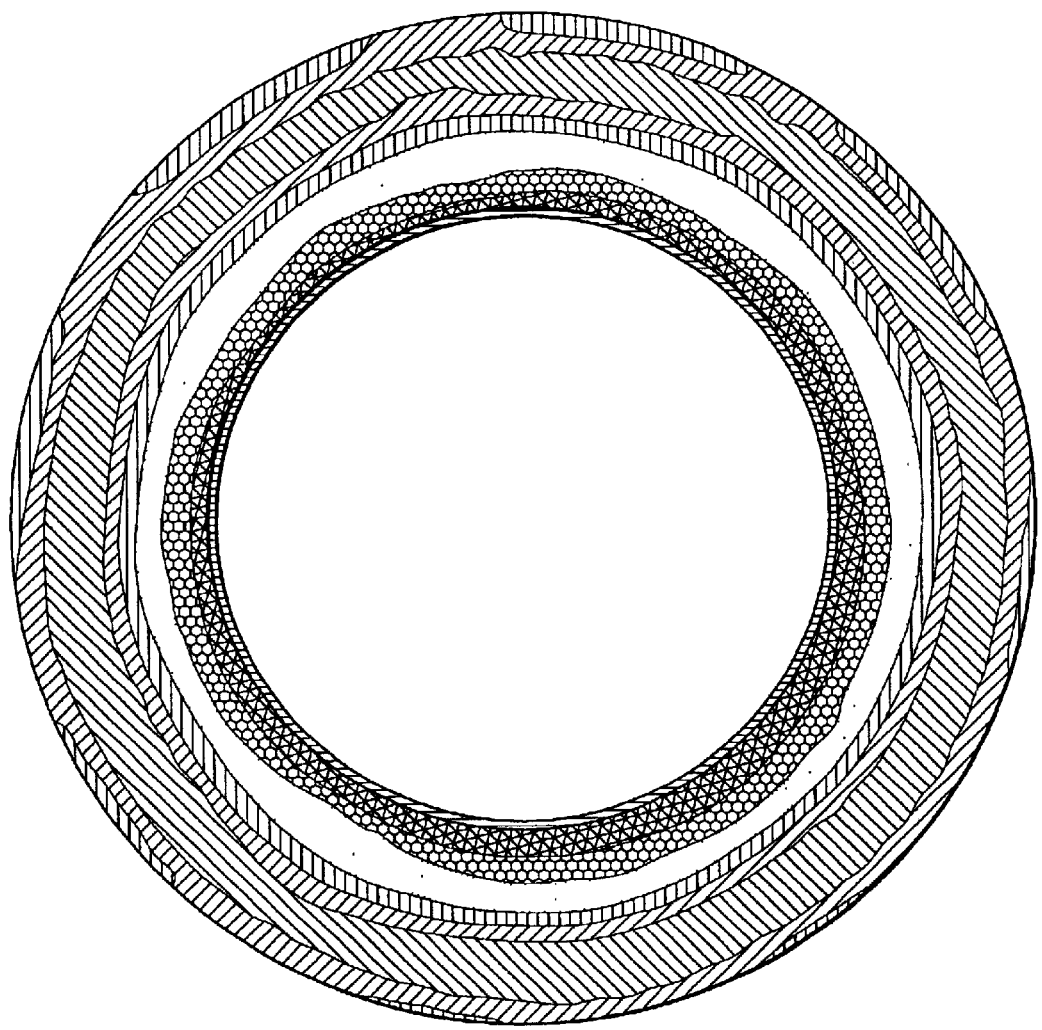
FIG. 9a is stress gradient diagram of the downstream surface of a baffled heat shield according to one embodiment of the present invention.
Figure 9B:
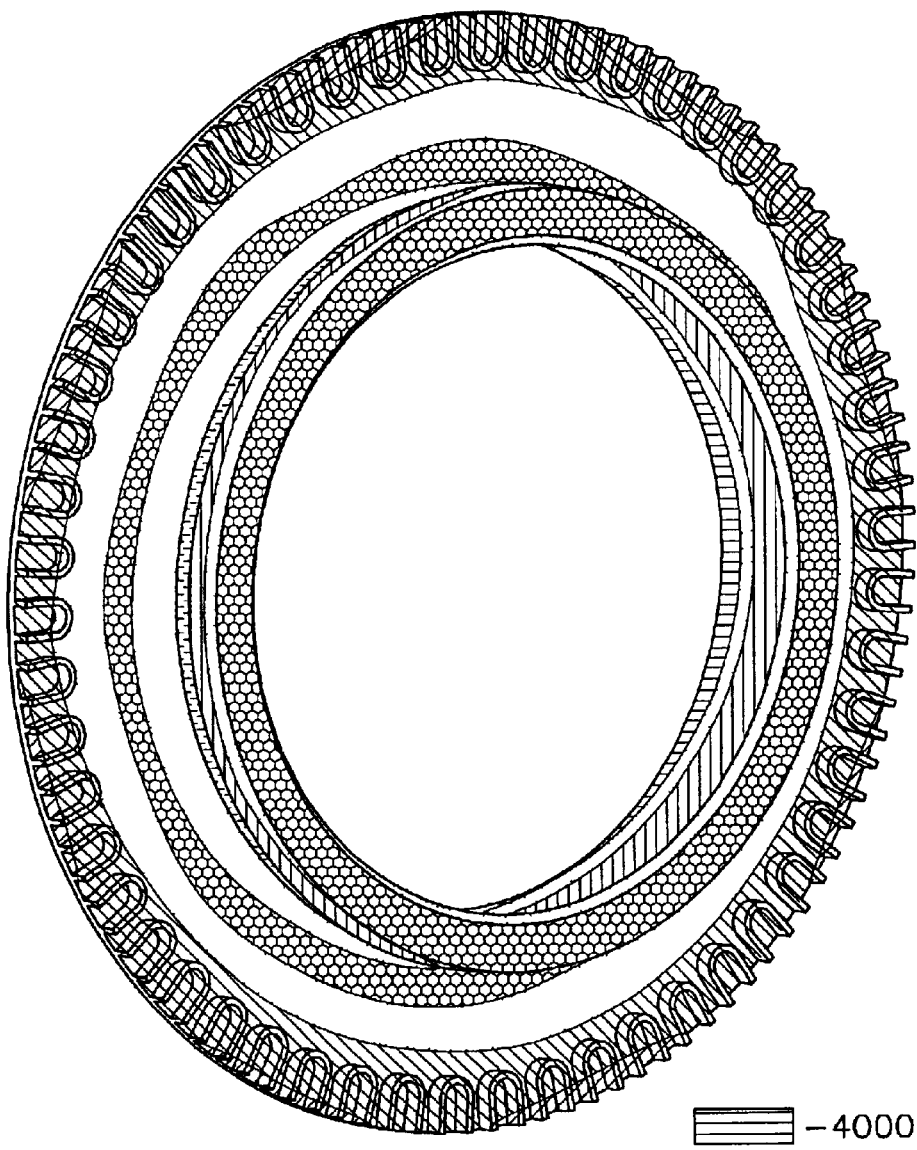
FIG. 9b is a stress gradient diagram of the upstream surface of a baffled heat shield according to one embodiment of the present invention.

Hoop stresses for the downstream surface and the upstream surface of a baffled Mar-M-247 Eqx heat shield are shown in FIGS. 9a and 9b respectively. An outer rim hoop stress was calculated to be 21 Ksi at 1660° F. An inner rim hoop stress was calculated to be −41.8 Ksi at 1730° F. An area between the baffles was calculated to be 31 Ksi at 1500° F.

As can be seen, the maximum hoop stress was lower for the baffled heat shield than for the unbaffled heat shield.

EXAMPLE 3

Hoop stresses of a baffled heat shield were compared to those of a baffled/slotted heat shield. Ansys 5.7.1 software was used to calculate the hoop stresses of a baffled heat shield and a baffled/slotted heat shield. Data from a Honeywell AS907 engine during Sea Level Take Off (SLTO) was used to calibrate the model.

Figure 10A:
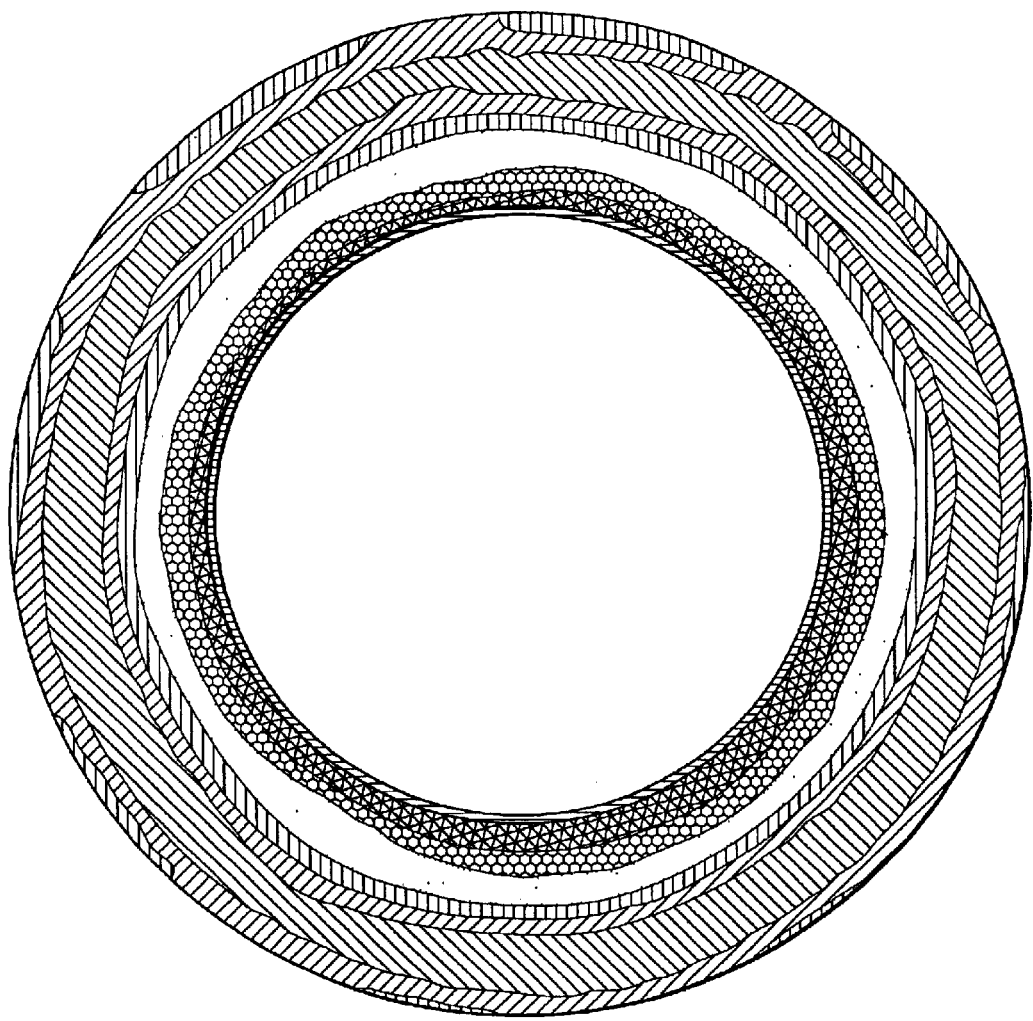
FIG. 10a is a stress gradient diagram of the downstream surface of a baffled heat shield according to one embodiment of the present invention.
Figure 10B:
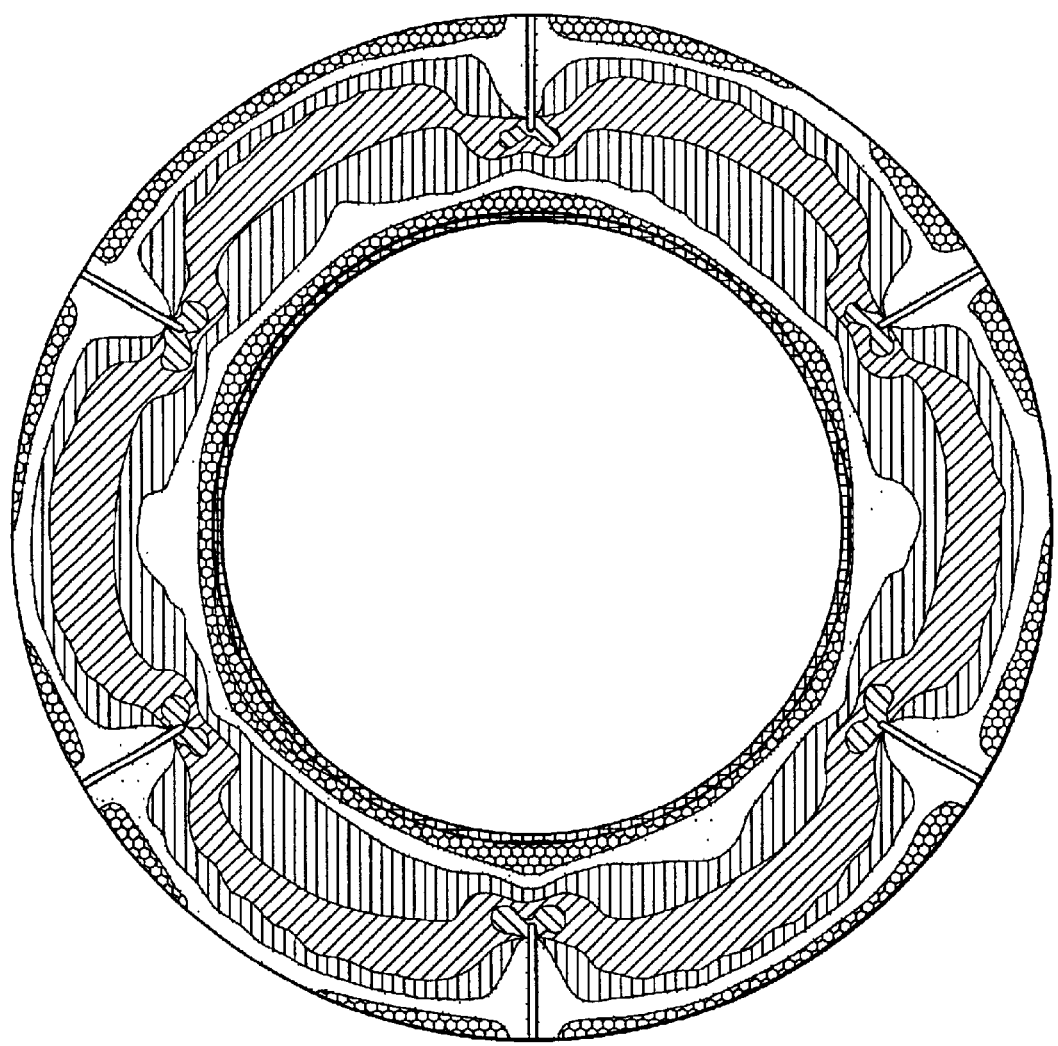
FIG. 10b is a stress gradient diagram of the downstream surface of a baffled/slotted heat shield according to one embodiment of the present invention.
Figure 11A:
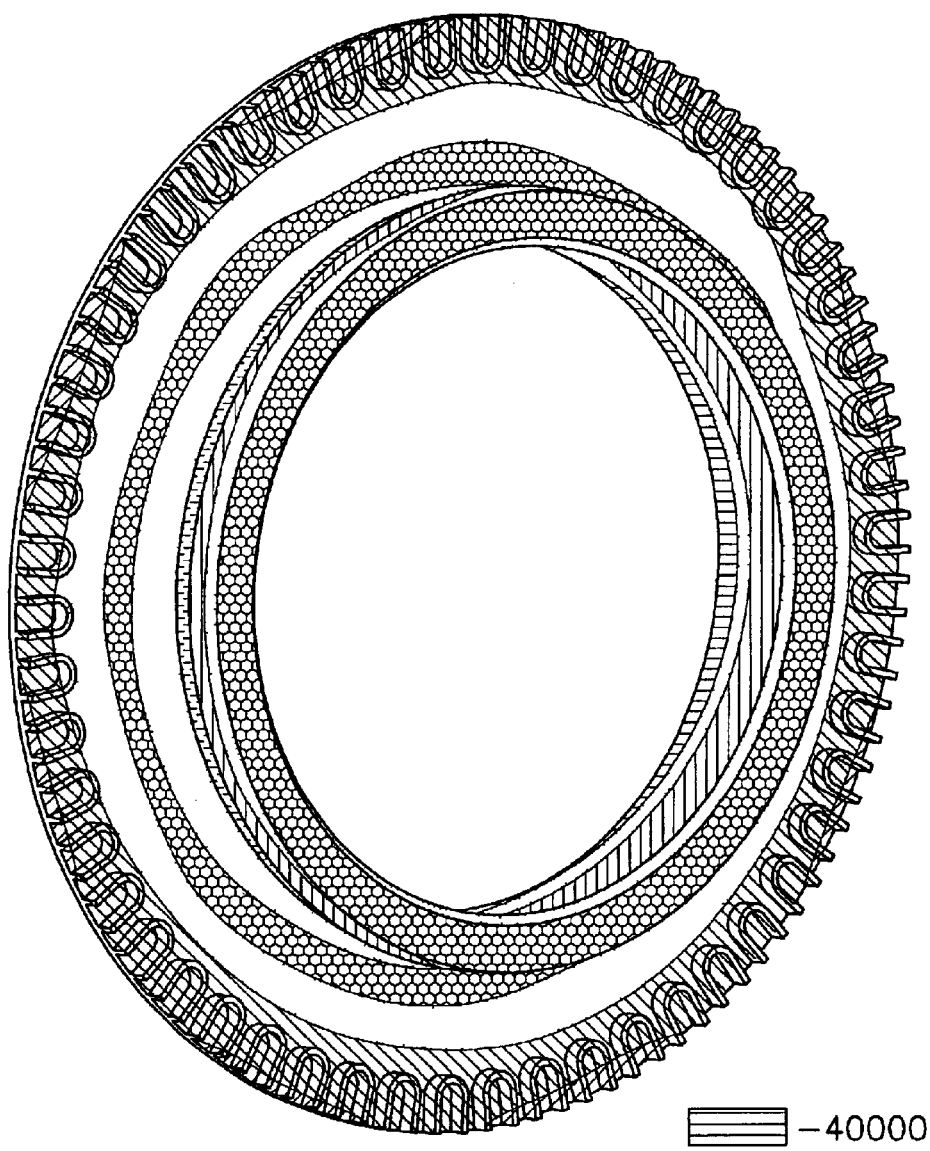
FIG. 11a is a stress gradient diagram of the upstream surface of a baffled heat shield according to one embodiment of the present invention.
Figure 11B:
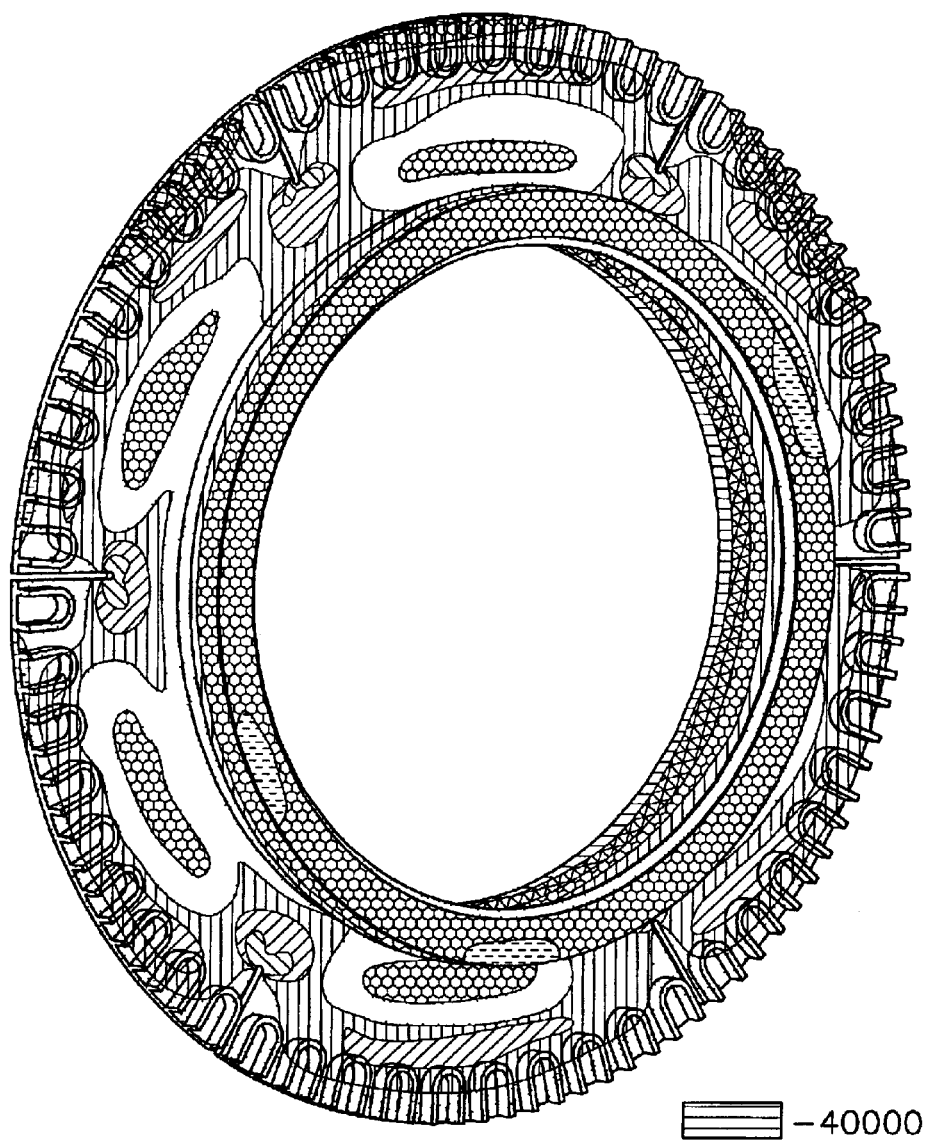
FIG. 11b is a stress gradient diagram of the upstream surface of a baffled/slotted heat shield according to one embodiment of the present invention.

Hoop stresses for the downstream surface of a baffled and a baffled/slotted Mar-M-247 Eqx heat shield are shown in FIGS. 10a and 10b, respectively. Hoop stresses for the upstream surface of a baffled and a baffled/slotted Mar-M-247 Eqx heat shield are shown in FIGS. 11a and 11b respectively. As can be seen, the slots further reduce the hoop stresses of the heat shield and break the hoop stress at the outer rim. High stresses apparent at the slot-bottom in FIGS. 10a, b and 11a, b result from the concentrating effect of the sharp corner at this location. These localized stresses may be reduced by the incorporation of the round keyhole at the inner extent of the slot. The keyhole may have a diameter equal to 3 or 4 times the slot width and be centered at the point of termination of the slot. The full life capacity of the baffled/slotted heat shield was calculated to be about 7,500 hours for the design application of the AS900 engine. For comparison, an unbaffled/unslotted heat shield has a full life capacity of about 1,500 hours. As can be seen, the present invention may increase the durability of a heat shield by about 500%.

As can be appreciated by those skilled in the art, the present invention provides improved heat shields and methods for their production. Also provided are heat shields having improved durability. A heat shield having improved cooling at the outer diameter area is also provided. Further, a heat shield capable of segregating impingement air flows is provided. Additionally, a heat shield with reduced hoop stress at the outer rim is provided. Moreover, heat shields with reduced temperature and stress gradients are provided.

It should be understood, of course, that the foregoing relates to preferred embodiments of the invention and that modifications may be made without departing from the spirit and scope of the invention as set forth in the following claims.

We claim:

1. A cooling apparatus for a combustor dome comprising:
an annular heat shield; and
a plurality of baffles positioned on an upstream surface of said annular heat shield, said baffles are U-shaped and each said baffle comprises an arc and two ribs, said arc is radially inward from said two ribs, said combustor dome has an outer row and at least one inner row of impingement openings there through.

2. The cooling apparatus of claim 1, wherein said annular heat shield and said baffles are formed from a metal selected from the group consisting of nickel based alloys and cobalt based alloys.

3. The cooling apparatus of claim 1, wherein said annular heat shield and said baffles are formed from a metal selected from the group consisting of (SC)180, HA230, Mar-M-247 Eqx, and MA754.

4. The cooling apparatus of claim 1, wherein said baffles are capable of segregating an air flow coming from said outer row of impingement openings from an air flow coming from said inner row of impingement openings.

5. The cooling apparatus of claim 1, wherein the distance between said two ribs is about twice the diameter of an impingement opening in said outer row.

6. The cooling apparatus of claim 1, wherein the height of said baffles is between 0.08 inches and about 0.09 inches.

7. The cooling apparatus of claim 1, wherein said baffles are clocked to said outer row of impingement openings such that air coming from an impingement opening in said outer row contacts said annular heat shield in an area between said two ribs of said baffle.

8. The cooling apparatus of claim 1, further comprising a plurality of slots extending radially inward from an outer rim of said heat shield.

9. The cooling apparatus of claim 8, further comprising a plurality of keyholes, one said keyhole positioned at a radially inward end of each said slot.

10. The cooling apparatus of claim 1, wherein said baffles are positioned on an outer diameter area of said heat shield.

11. An apparatus for a turbine engine comprising:
an annular heat shield;
a plurality of baffles on an outer diameter area of said annular heat shield; and
a plurality of slots, each slot extending radially inward from an outer rim of said annular heat shield and contiguously terminating with a keyhole formed in a radially inward end of each said slot.

12. The apparatus of claim 11, wherein said baffles have a length between about 0.15 inches and about 0.25 inches.

13. The apparatus of claim 11, wherein each said baffle is U-shaped and comprises an arc and two ribs, said arc is radially inward from said two ribs.

14. The apparatus of claim 13, wherein each said rib has a width of between about 0.020 inches and about 0.030 inches.

15. The apparatus of claim 11, wherein said turbine engine has a combustor dome, said combustor dome is capable of producing an air flow, and wherein said baffles are clocked such that said baffles are capable of segregating said air flow.

16. The apparatus claim 11, wherein said annular heat shield is secured within said combustor dome by a split ring.

17. The apparatus claim 11, wherein said slot has a length between about 0.15 inches and about 0.35 inches.

18. A shielding system for a combustor dome comprising:
an annular heat shield; and
at least one U-shaped baffle positioned on an upstream surface of said annular heat shield, said U-shaped baffle is clocked such that said U-shaped baffle is capable of segregating an air flow, said U-shaped baffle comprises an arc and two ribs, said arc is radially inward from said two ribs, said combustor dome has an outer row and at least one inner row of impingement openings there through.

19. The shielding system of claim 18, wherein air coming from an impingement opening in said outer row contacts said annular heat shield in an area between said two ribs of said U-shaped baffle and air coming from an impingement opening in said inner row contacts said annular heat shield in an area radially inward from said U-shaped baffle.

20. The shielding system of claim 18, wherein said U-shaped baffle has a length between about 0.15 inches and about 0.25 inches.

21. The shielding system of claim 18, wherein said U-shaped baffle has a height between about 0.08 inches and about 0.09 inches.

22. The shielding system of claim 18, further comprising at least one radial slot extending inward from an outer rim of said annular heat shield.

23. The shielding system of claim 22, further comprising a keyhole positioned at a radially inward end of said slot.

24. The shielding system of claim 18, wherein a plurality of said U-shaped baffles are evenly spaced on said annular heat shield.

25. The shielding system of claim 18, wherein said annular heat shield is formed from a metal selected from the group consisting of (SC)180, HA230, Mar-M-247 Eqx, and MA754.

26. The shielding system of claim 18, wherein said U-shaped baffle is positioned in an outer diameter area of said annular heat shield.

27. A cooling apparatus for a combustor dome comprising:
of an annular heat shield formed from a metal selected from the group consisting of (SC)180, HA230, Mar-M-247 Eqx, and MA754;
a plurality of baffles positioned on an upstream surface of said annular heat shield, said baffles each comprise an arc and two ribs, said ribs have a width between about 0.020 inches and about 0.030 inches, said combustor dome has an outer row and at least one inner row of impingement openings there through, said baffles are clocked such that said baffles are capable of segregating an air flow from said outer row of impingement openings from an air flow from an inner row of impingement openings;
a plurality of slots extending radially inward from an outer rim of said annular heat shield; and
a plurality of keyholes through said annular heat shield, such that there is one keyhole at an inner end of each said slot.

28. A method of cooling a combustor dome comprising the steps of:
providing an annular heat shield downstream of said combustor dome, said combustor dome having an inner and an outer row of impingement openings therethrough, said inner row being capable of producing an inner row air flow, said outer row being capable of producing an outer row air flow; and
positioning a plurality of baffles on an upstream surface of said annular heat shield, each said baffle comprising an arc and two ribs, said arc positioned radially inward from said two ribs, such that said inner row air flow is segregated from said outer row air flow.

29. The method of claim 28, wherein said baffles are clocked to said outer row of impingement openings such that air coming from an impingement opening in said outer row contacts said annular heat shield in an area between said two ribs of said baffle.

30. The method of claim 28, wherein a distance between said two ribs is about twice the diameter of an impingement opening in said outer row.

31. The method of claim 28, wherein each said baffle is U-shaped.

32. The method of claim 28, further comprising a step of producing a plurality of radial slots in an outer diameter area of said annular heat shield.

33. The method of claim 28, wherein said baffles are integral to said annular heat shield.

* * * * *